(12) United States Patent
Ichisawa (10) Patent No.: US 10,788,353 B2
(45) Date of Patent: Sep. 29, 2020

(54) LIQUID-SURFACE DETECTION DEVICE

(71) Applicant: NIPPON SEIKI CO., LTD., Niigata (JP)

(72) Inventor: Hisahito Ichisawa, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 16/478,763

(22) PCT Filed: Jan. 16, 2018

(86) PCT No.: PCT/JP2018/000951
§ 371 (c)(1),
(2) Date: Jul. 17, 2019

(87) PCT Pub. No.: WO2018/139257
PCT Pub. Date: Aug. 2, 2018

(65) Prior Publication Data
US 2019/0360852 A1 Nov. 28, 2019

(30) Foreign Application Priority Data

Jan. 25, 2017 (JP) ................................ 2017-011249

(51) Int. Cl.
*G01F 23/38* (2006.01)
(52) U.S. Cl.
CPC ..................... *G01F 23/38* (2013.01)
(58) Field of Classification Search
CPC ........ G01F 23/38; G01F 23/36; G01F 23/363; G01F 23/366
See application file for complete search history.

(56) References Cited

U.S. PATENT DOCUMENTS

2005/0083045 A1 4/2005 Miyagawa
2009/0064777 A1 3/2009 Mundo
(Continued)

FOREIGN PATENT DOCUMENTS

JP 2005-010047 A 1/2005
JP 2011-185616 A 9/2011
(Continued)

OTHER PUBLICATIONS

International Search Report issued in corresponding International Patent Application No. PCT/JP2018/000951, dated Mar. 27, 2018, with English Translation.

*Primary Examiner* — Paul M. West
(74) *Attorney, Agent, or Firm* — McDermott Will & Emery LLP (57) ABSTRACT

To provide a liquid-surface detection device having a small parts count, whereby electrolytic corrosion can be suppressed. A liquid-surface detection device has a detection part for detecting magnetism, a plurality of terminals connected by one end thereof to the detection part, a first retaining body for retaining the terminals and rotatably supporting a magnetic part, a second retaining body attached to the first retaining body, and electroconductive parts retained by the second retaining body and connected to other ends of the terminals. The first retaining body has substantially U-shaped surrounding parts for surrounding other ends of the plurality of terminals, respectively. The second retaining body has dividing parts overlapping between the surrounding parts.

5 Claims, 9 Drawing Sheets

(56) References Cited

U.S. PATENT DOCUMENTS

| | | |
|---|---|---|
| 2015/0247752 A1 | 9/2015 | Iryo et al. |
| 2015/0362356 A1 | 12/2015 | Fukuhara et al. |
| 2019/0137319 A1* | 5/2019 | Manabe ................ G01F 23/363 |

FOREIGN PATENT DOCUMENTS

| | | | | |
|---|---|---|---|---|
| JP | 2013-171015 A | | 9/2013 | |
| JP | 2014137271 A | * | 7/2014 | ............. G01F 23/38 |
| WO | 2014/050499 A1 | | 4/2014 | |
| WO | 2014/132962 A1 | | 9/2014 | |

* cited by examiner

(a) COMPARATIVE EXAMPLE

FIG. 7(B)

(b) EMBODIMENT

LIQUID-SURFACE DETECTION DEVICE

CROSS REFERENCE

This application is the U.S. National Phase under 35 U.S.C. § 371 of International Application No. PCT/JP2018/000951, filed on Jan. 16, 2018, which claims the benefit of Japanese Application No. 2017-011249, filed on. Jan. 25, 2017, the entire contents of each are hereby incorporated by reference.

TECHNICAL FIELD

The present invention relates to a float-type liquid-surface detection device.

BACKGROUND ART

Some of devices that detect the level of a liquid surface are of a type using a float that floats on the liquid surface. The technology in Patent Document 1 is disclosed as a conventional technology of a float-type liquid-surface detection device.

The liquid-surface detection device disclosed in Patent Document 1 includes: a float that floats on a liquid surface; a magnetic part that rotates in accordance with the movement of the float; a detection part that detects magnetism which changes due to the rotation of the magnetic part; three terminals having one end connected to the detection part; a first retaining body that retains the terminals and rotatably supports the magnetic part; a second retaining body that is attached to the first retaining body; and three electric wires (electroconductive parts) that are retained by the second retaining body and are connected to the other ends of the three terminals, respectively.

Three connection parts where a terminal and an electric wire are in contact are immersed in the liquid depending on the level of the liquid surface. When the potentials of the connection parts are different from each other, ions melt into the liquid from part of the high-potential connection part, and they adhere to the low-potential connection part, what is called electrolytic corrosion sometimes occurs. As a result, there is a possibility that the detection accuracy of the liquid surface level is lowered.

The configuration around the three connection parts is described. The three connection parts are separated from each other by four wall parts. The four wall parts are integrally formed with the end part of the first retaining body, and the second retaining body is in contact with the end part. The four wall parts and the second retaining body are sandwiched between the bottom part and a lid part opposed to the bottom part. This allows each of the three connection parts to be surrounded in a tubular shape by the wall part, the bottom part, and the lid part. Therefore, when ions move, the movement path of the ions is long. As a result, ions are unlikely to melt out from the high-potential connection part, and electrolytic corrosion may be suppressed.

PRIOR ART DOCUMENT

Patent Document

Patent Document 1: Japanese Unexamined Patent Publication No. 2011-185616

SUMMARY OF THE INVENTION

Problems to be Solved by the Invention

According to the invention disclosed in Patent Document 1, in order for the three connection parts to be surrounded in a tubular shape, after the second retaining body comes into contact with the first retaining body and the terminal and the electric wire are brought into contact with each other, there is further a need to engage each of the bottom part and the lid part with the wall part (part of the first retaining body).

An object of the present invention is to provide a liquid-surface detection device capable of suppressing electrolytic corrosion with a small number of parts.

Solution to Problem

The present invention according to claim 1 provides a liquid-surface detection device including: a float that floats on a liquid surface; a magnetic part that rotates in accordance with a movement of the float; a detection part that detects magnetism which changes due to a rotation of the magnetic part; a plurality of terminals having one end connected to the detection part; a first retaining body that retains the terminals and rotatably supports the magnetic part; a second retaining body that is attached to the first retaining body; and an electroconductive part that is retained by the second retaining body and connected to other ends of the terminals, wherein the first retaining body includes substantially U-shaped surrounding parts that surround the other ends of the terminals, respectively, the second retaining body includes a dividing part that is sandwiched between the surrounding part and the surrounding part, and one end of the dividing part protrudes toward an opening side of the surrounding part.

As set forth in claim 2, it is preferable that the liquid-surface detection device further includes an outer casing body that covers the magnetic part, wherein the outer casing body includes a protective part that covers a bottom side of the surrounding part, and the protective part is provided with an accommodating part that accommodates a distal end part of the dividing part.

As set forth in claim 3, it is preferable that the surrounding part includes an inner hole facing the other end of the terminal.

As set forth in claim 4, it is preferable that the surrounding part includes an inner hole facing the other end of the terminal, and the protective part includes an outer hole facing the other end of the terminal through the inner hole.

Effect of the Invention

In the invention according to claim 1, the liquid-surface detection device includes: a first retaining body that retains a plurality of terminals; a second retaining body that is attached to the first retaining body; and an electroconductive part that is retained by the second retaining body and is connected to the other end of the terminal. The first retaining body includes substantially U-shaped surrounding parts that surround the other ends of the terminals, respectively, the second retaining body includes a dividing part that is sandwiched between the surrounding part and the surrounding part, and one end of the dividing part protrudes toward the opening side of the surrounding part.

That is, when the second retaining body is attached to the first retaining body, the dividing part of the second retaining body is sandwiched between the surrounding part and the surrounding part, and one end of the dividing part protrudes toward the opening side of the surrounding part. Ions are generated from the terminal surrounded by the surrounding part, and when they move toward the other surrounding part, the ions need to move so as to avoid the dividing part. Compared with the case where there is no dividing part, the movement distance of the ions is long, and therefore generation of ions, that is, electrolytic corrosion is suppressed. The above configuration is established when the second retaining body is attached to the first retaining body, and no separate parts are needed. As a result, electrolytic corrosion may be suppressed by reducing the number of parts.

In the invention according to claim 2, the liquid-surface detection device further includes an outer casing body that covers the first retaining body. The outer casing body includes a protective part that covers the bottom side of the surrounding part, and the protective part is provided with an accommodating part that accommodates the distal end part of the dividing part. That is, the dividing part extends until it protrudes from between the surrounding part and the surrounding part. As the dividing part is longer, the movement distance of ions is further longer, and electrolytic corrosion may be further suppressed. In addition, the distal end part of the dividing part is accommodated in the accommodating part. As the accommodating part also serves a function for positioning, it is further ensured that the outer casing body is assembled at a predetermined position.

In the invention according to claim 3, the surrounding part includes an inner hole facing the other end of the terminal. Therefore, when the terminal and the electroconductive part are resistance-welded, one electrode may be in contact with the terminal through the inner hole and the other electrode may be in contact with the electroconductive part from the U-shaped opening side. As a result, workability of resistance welding is improved.

In the invention according to claim 4, the surrounding part includes an inner hole facing the other surface of the terminal, and the protective part includes an outer hole facing the other end of the terminal through the inner hole. Therefore, in the case where the terminal and the electroconductive part are resistance-welded in a state where the outer casing body is attached, one electrode may be in contact with the terminal through the inner hole and the outer hole, and the other electrode may be in contact with the electroconductive part from the U-shaped opening side. As a result, workability of resistance welding is improved.

MODE FOR CARRYING OUT THE INVENTION

Embodiments of the present invention are described below with reference to the accompanying drawings. In the figure, Fr denotes front, Rr rear, L left, R right, Up upper, and Dn lower.

First Embodiment

Figure 1:
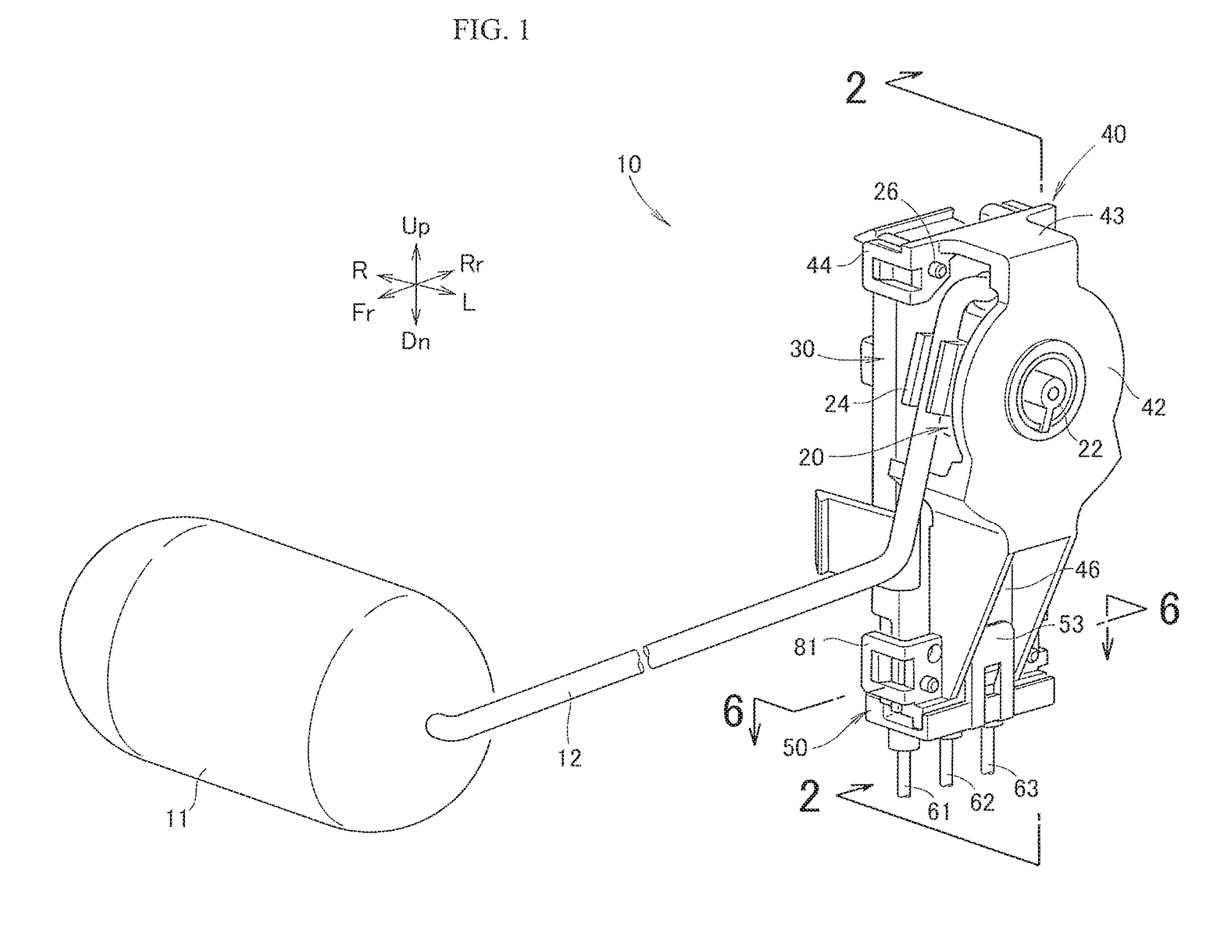
FIG. 1 is a perspective view of a liquid-surface detection device according to a first embodiment of the present invention.

FIG. 1 shows a liquid-surface detection device 10 according to a first embodiment of the present invention. The liquid-surface detection device 10 is of a float type using a float 11 floating on a liquid surface and is provided in a fuel tank for storing a liquid fuel such as gasoline.

Figure 2:
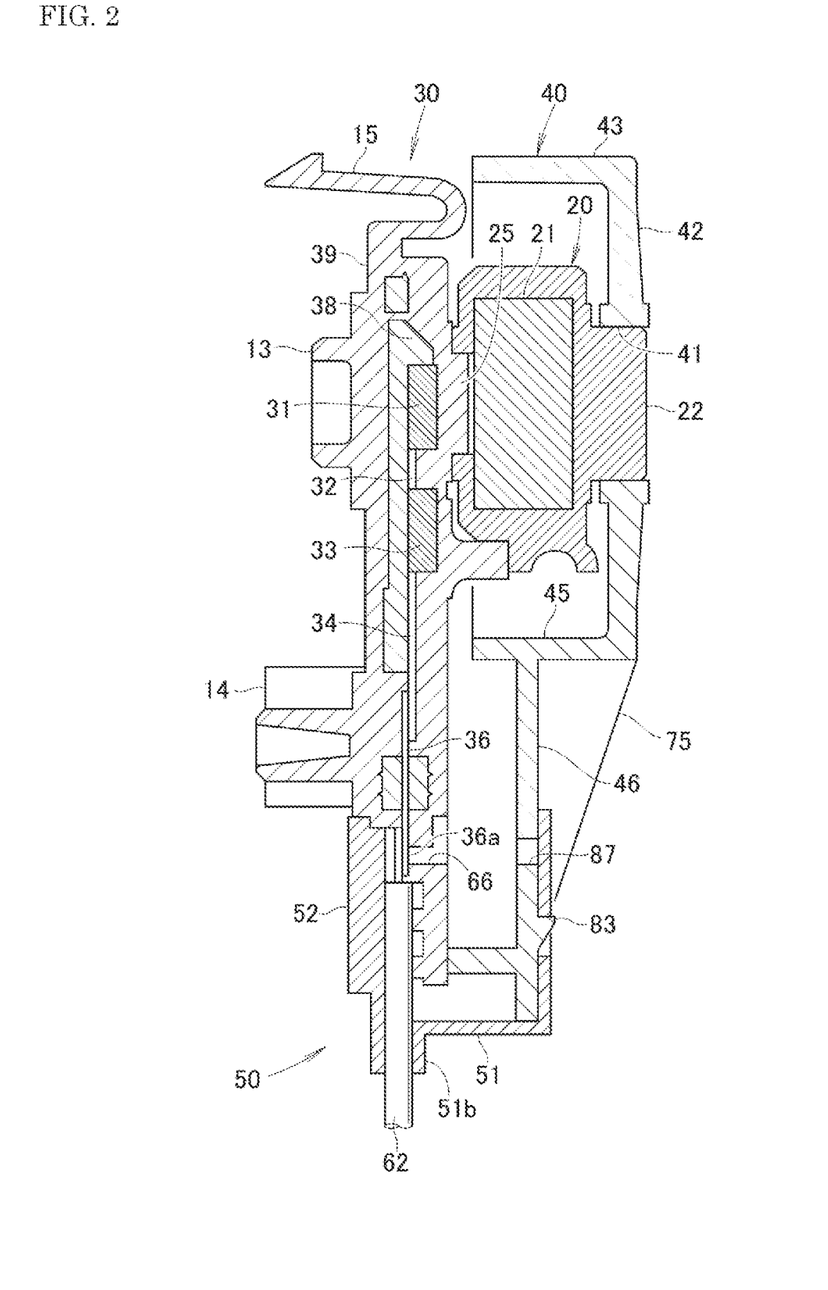
FIG. 2 is a cross-sectional view taken along the line 2-2 of FIG. 1.

A reference is made to FIG. 1 and FIG. 2. The liquid-surface detection device 10 includes: a float 11 floating on a liquid surface; an arm 12 having one end fixed to the float 11; a magnetic part 20 fixed to the other end of the arm 12 and rotating as the float 11 moves; a first retaining body 30 rotatably supporting the magnetic part 20; an outer casing body 40 covering the magnetic part 20; a second retaining body 50 attached to the first retaining body 30; and a first electric wire 61 to a third electric wire 63 (the first electroconductive part 61 to the third electroconductive part 63) retained by the second retaining body 50.

Figure 3:
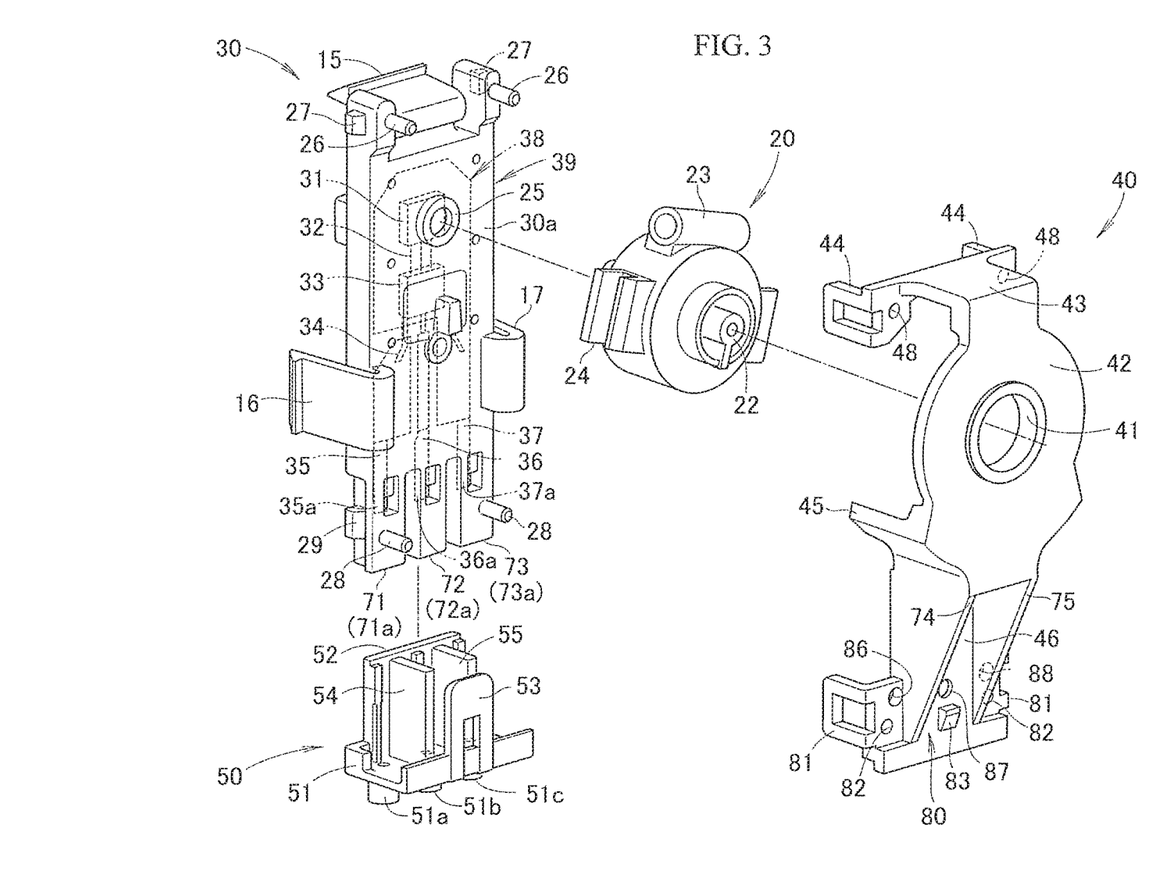
FIG. 3 is an exploded perspective view of the liquid-surface detection device shown in FIG. 1.

A reference is made to FIG. 2 and FIG. 3. The magnetic part 20 includes a cylindrical magnet 21 by insert molding. The magnetic part 20 includes: a rotary shaft part 22 serving as a rotation center; and fixing parts 23 and 24 to which the other end of the arm 12 is fixed. As the resin material used for the insert molding, for example, polyacetal or the like is adopted. The magnet 21 is made of, for example, neodymium or ferrite and is magnetized with two poles.

The first retaining body 30 includes: a magnetic detection element 31 (the detection part 31) that detects magnetism which changes due to the rotation of the magnetic part 20; an electronic component 33 coupled to the magnetic detection element 31 via a first lead wire 32; a first terminal 35 to a third terminal 37 having one end coupled to the electronic component 33 via a second lead wire 34; a first resin body 38 retaining these components, and a second resin body 39 covering the first resin body 38 by insert molding.

The magnetic detection element 31 has a built-in Hall IC. The electronic component 33 has, for example, a noise absorbing capacitor, a resistor, etc., built in and supplies power and transmits detection signals. The first resin body 38 and the second resin body 39 are made of a resin material such as polyacetal.

A front surface portion 30a of the first retaining body 30 has a cylindrical part 25 into which the magnetic part 20 is inserted. On the upper portion of the first retaining body 30 are formed first rod-like positioning parts 26, 26 and first protruding parts 27, 27 with which the upper portion of the outer casing body 40 is engaged. Similarly, on the lower portion of the first retaining body 30 are formed second rod-like positioning parts 28, 28 and second protruding parts 29, 29 (only one of the protruding parts 29 is shown) with which the lower portion of the outer casing body 40 is engaged.

Figure 4:
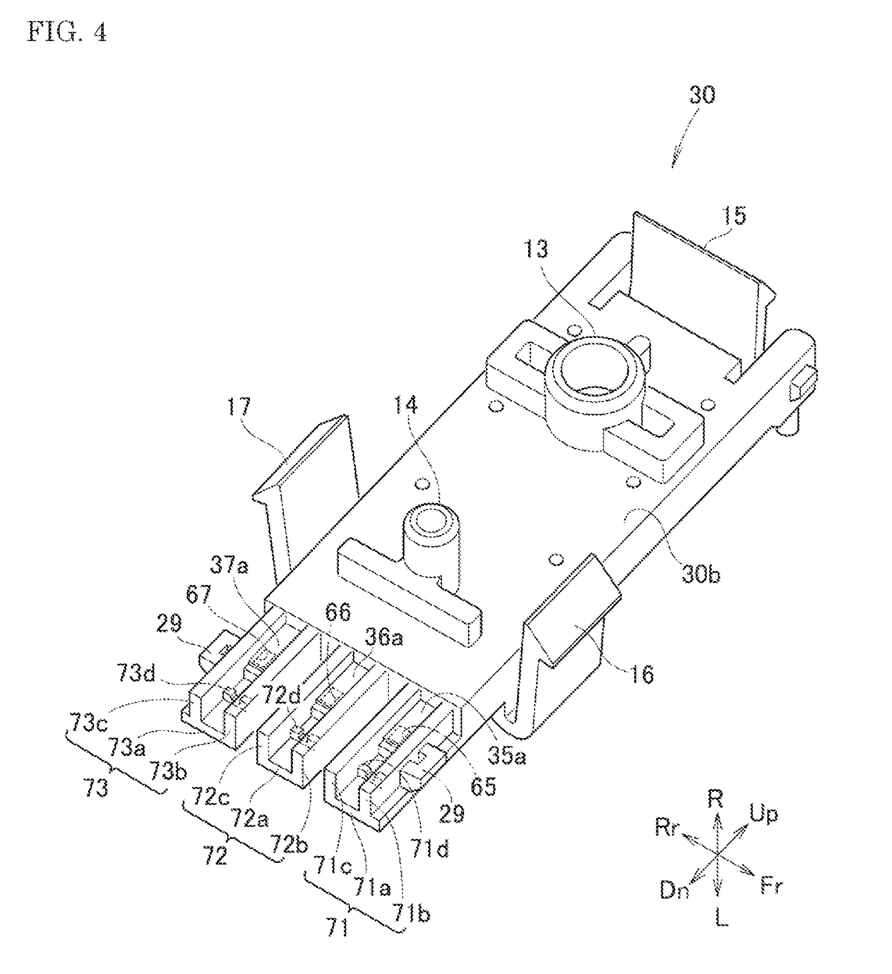
FIG. 4 is a perspective view of a first retaining body of the liquid-surface detection device shown in FIG. 3.

A reference is made to FIG. 3 and FIG. 4. The first retaining body 30 includes a first surrounding part 71 to a third surrounding part 73 having substantially a U shape and surrounding other ends 35a to 37a of the first terminal 35 to the third terminal 37, respectively. The first surrounding part 71 to the third surrounding part 73 are spaced apart from each other by a predetermined distance.

The first surrounding part 71 includes: a first bottom part 71a; a first front wall part 71b extending from the front end of the first bottom part 71a; and a first rear wall part 71c extending from the rear end of the first bottom part 71a. A first electric-wire retaining part 71d for retaining the first electric wire 61 (see FIG. 1) is formed on the inner circumference side of the first surrounding part 71.

Similarly, the second surrounding part 72 includes a second bottom part 72a, a second front wall part 72b, and a second rear wall part 72c. A second electric-wire retaining part 72d is formed on the inner circumference side of the second surrounding part 72. Similarly, the third surrounding part 73 includes a third bottom part 73a, a third front wall part 73b, and a third rear wall part 73c. A third electric-wire retaining part 73d is formed on the inner circumference side of the third surrounding part 73.

The first electric wire 61 to the third electric wire 63 (see FIG. 1) are composed of, for example, a copper core wire and a coating of fluororesin, or the like, covering the core wire.

A back surface portion 30b of the first retaining body 30 is provided with positioning bosses 13, 14 for determining the position to be attached to a fuel pump, an attachment stay, or the like. Further, the first retaining body 30 is provided with hooks 15 to 17 to be attached to a fuel pump, or the like.

A reference is made to FIG. 3. The outer casing body 40 includes: a disk part 42 having a retaining hole 41 formed for rotatably retaining the rotary shaft part 22; a first restraining part 43 provided on the upper end of the disk part 42 and restraining the movement of the arm 12 (see FIG. 1); first engaging parts 44, 44 provided at both ends of the first restraining part 43 and engaging with the first protruding parts 27, 27; a second restraining part 45 provided at the lower end of the disk part 42 and restraining the movement of the arm 12; an extending part 46 extending downward from the second restraining part 45; a protective part 80 provided under the extending part 46 and covering the U-shaped bottom side of the first surrounding part 71 to the third surrounding part 73; and second engaging parts 81, 81 provided at both ends of the protective part 80 and engaging with the second protruding parts 29, 29.

A first rib 74 is formed at the front end of the extending part 46. A second rib 75 is formed at the rear end of the extending part 46. The first rib 74 and the second rib 75 become lower as they go downward.

The first engaging part 44 includes first positioning holes 48, 48 into which the first positioning parts 26, 26 are inserted. The protective part 80 includes second positioning holes 82, 82 into which the second positioning parts 28, 28 are inserted and a third protruding part 83. The outer casing body 40 is made of, for example, a resin material such as polyacetal.

Figure 5:
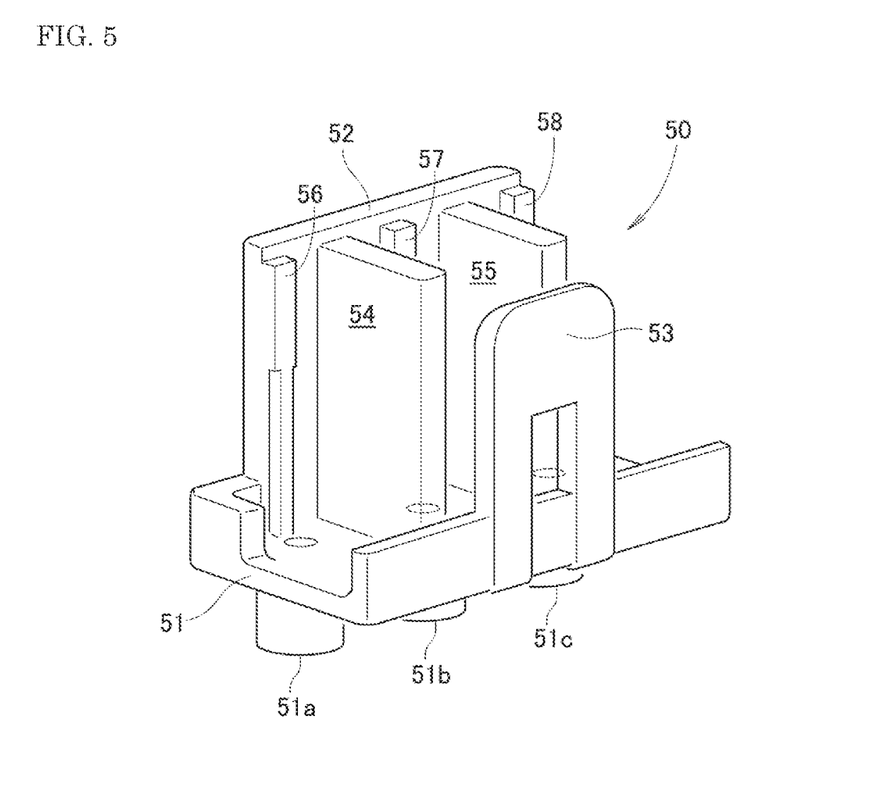
FIG. 5 is an enlarged view of a second retaining body of the liquid-surface detection device shown in FIG. 3.

A reference is made to FIG. 3 and FIG. 5. The second retaining body 50 includes: a base part 51, a first cylindrical part 51a to a third cylindrical part 51c provided on the lower portion of the base part 51 and retaining the first electric wire 61 to the third electric wire 63 (see FIG. 1); a lid part 52 extending upward from one end of the base part 51; a third engaging part 53 extending upward from the other end of the base part 51 and engaging with the third protruding part 83; and a first dividing part 54 and a second dividing part 55 extending from the lid part 52 toward the third engaging part 53.

At the front end of the lid part 52, a first pressing part 56 protruding toward the third engaging part 53 is formed. Similarly, a second pressing part 57 protruding toward the third engaging part 53 is formed at the center of the lid part 52. On the rear end of the lid part 52, a third pressing part 58 protruding toward the third engaging part 53 is formed. The second retaining body 50 is made of, for example, a resin material such as polyacetal.

Figure 6:
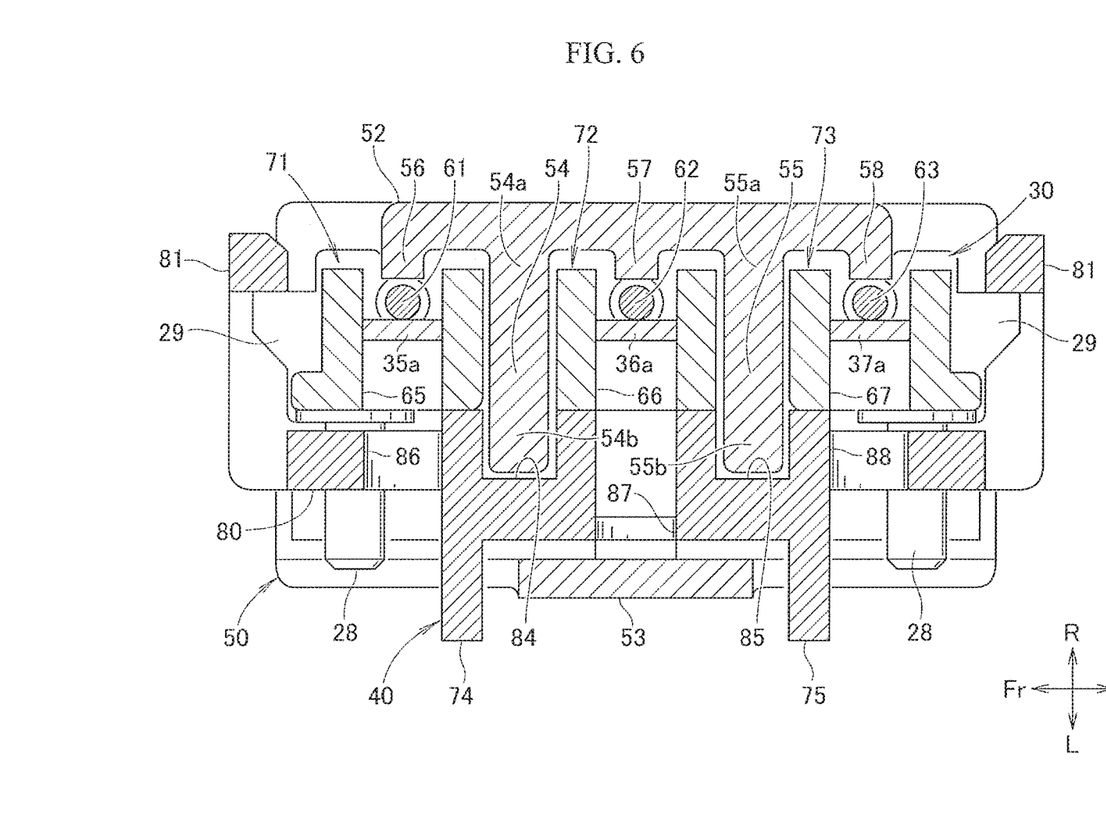
FIG. 6 is a cross-sectional view taken along the line 6-6 of FIG. 1.

A reference is made to FIG. 6. The lid part 52 covers the opening side of the first surrounding part 71 to the third surrounding part 73. The first dividing part 54 is sandwiched between the first surrounding part 71 and the second surrounding part 72. A proximal end part 54a (the one end 54a) of the first dividing part 54 protrudes from between the first surrounding part 71 and the second surrounding part 72 toward the opening side (rightward in FIG. 6). Likewise, the second dividing part 55 is sandwiched between the second surrounding part 72 and the third surrounding part 73. A proximal end part 55a (the one end 55a) of the second dividing part 55 protrudes from between the second surrounding part 72 and the third surrounding part 73 toward the opening side.

The protective part 80 sandwiches the first surrounding part 71 to the third surrounding part 73 together with the lid part 52. The protective part 80 is in contact with the first surrounding part 71 to the third surrounding part 73.

The protective part 80 is provided with a first accommodating part 84 accommodating a first distal end part 54b of the first dividing part 54. Similarly, the protective part 80 is provided with a second accommodating part 85 accommodating a second distal end part 55b of the second dividing part 55.

The first pressing part 56 is in contact with the first electric wire 61. The second pressing part 57 is in contact with the second electric wire 62. The third pressing part 58 is in contact with the third electric wire 63.

A reference is made to FIG. 3 and FIG. 6. The first bottom part 71a includes a first inner hole 65 facing the other end 35a of the first terminal 35. Similarly, the second bottom part 72a includes a second inner hole 66 facing the other end 36a of the second terminal 36. The third bottom part 73a includes a third inner hole 67 facing the other end 37a of the third terminal 37.

The protective part 80 includes a first outer hole 86 facing the other end 35a of the first terminal 35 through the first inner hole 65. Similarly, the protective part 80 includes a second outer hole 87 facing the other end 36a of the second terminal 36 through the second inner hole 66. The protective part 80 includes a third outer hole 88 facing the other end 37c of the third terminal 37 through the third inner hole 67.

The first rib 74 is located between the first surrounding part 71 and the second surrounding part 72. The second rib 75 is located between the second surrounding part 72 and the third surrounding part 73.

Next, an effect of the present invention is described.

A reference is made to FIG. 6. The first retaining body 30 includes the first surrounding part 71 to the third surrounding part 73 surrounding the first terminal 35 to the third terminal 37, respectively. The second retaining body 50 includes: the lid part 52 covering the opening side of the first surrounding part 71 to the third surrounding part 73; and the first dividing part 54 and the second dividing part 55 extending from the lid part 52.

The first dividing part 54 is sandwiched between the first surrounding part 71 and the second surrounding part 72. The proximal end part 54*a* of the first dividing part 54 protrudes from between the first surrounding part 71 and the second surrounding part 72 toward the opening side (rightward in FIG. 6). Likewise, the second dividing part 55 is sandwiched between the second surrounding part 72 and the third surrounding part 73. The proximal end part 55*a* of the second dividing part 55 protrudes from between the second surrounding part 72 and the third surrounding part 73 toward the opening side.

An explanation is given of, for example, a case where an ion generated from the other end 35*a* of the first terminal 35 connected to the first electric wire 61 moves toward the other end 36*a* of the second terminal 36.

Figure 7A:
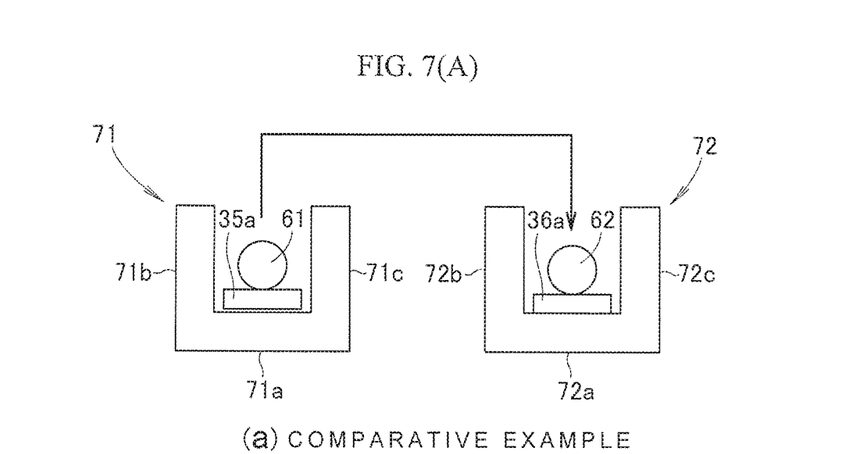
FIG. 7(A) and FIG. 7(B) are diagrams that explains an effect of the present invention.

A reference is made to FIG. 7(A). FIG. 7(A) shows the relevant part of the liquid-surface detection device according to a comparative example. When the first dividing part 54 is not provided, an ion moves linearly from the first terminal 35 to the second terminal 36.

Figure 7B:
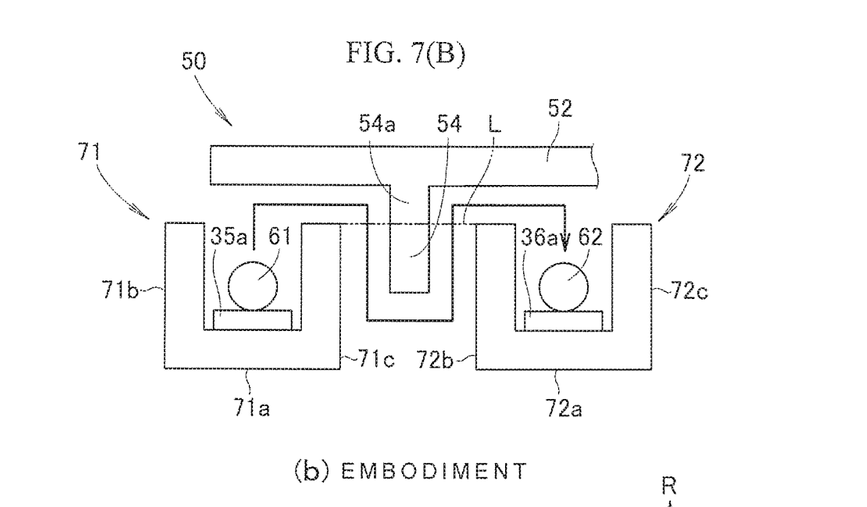

A reference is made to FIG. 7(B). FIG. 7(B) shows the relevant part of the liquid-surface detection device according to the embodiment. On the other hand, according to the present invention, the first dividing part 54 is sandwiched between the first surrounding part 71 and the second surrounding part 72, and the proximal end part 54*a* of the first dividing part 54 protrudes from between the first surrounding part 71 and the second surrounding part 72 toward the opening side (the right side of the chain line L). Ions need to move so as to avoid the first dividing part 54. As the movement distance of ions are long, generation of ions, that is, electrolytic corrosion is suppressed. The configuration shown in FIG. 7(B) is established when the second retaining body 50 is attached to the first retaining body 30, and no separate parts are needed. As a result, electrolytic corrosion may be suppressed by reducing the number of parts.

A reference is made to FIG. 6. Furthermore, the lid part 52 may be in contact with the first surrounding part 71 to the third surrounding part 73. In this case, it can be said that the proximal end part 54*a* of the first dividing part 54 and the proximal end part 55*a* of the second dividing part 55 constitute part of the lid part 52 so that each of the proximal end parts 54*a*, 55*a* protrudes.

A reference is made to FIG. 6. In addition, the protective part 80 of the outer casing body 40 is provided with the first accommodating part 84 accommodating the first distal end part 54*b* of the first dividing part 54. That is, the first dividing part 54 extends until it protrudes from between the first surrounding part 71 and the second surrounding part 72 (longer than the first dividing part 54 shown in FIG. 7(B)). The movement distance of ions is further longer, and electrolytic corrosion may be further suppressed.

In addition, the first rib 74 is positioned between the first surrounding part 71 and the second surrounding part 72. When ions generated from the first terminal 35 pass through the outer side (the left direction in FIG. 6) of the outer casing body 40 and go toward the second terminal 36, the ions move so as to avoid the first rib 74. The movement distance of ions is further longer, and electrolytic corrosion may be suppressed.

In addition, the first distal end part 54*b* is accommodated in the first accommodating part 84. As the first accommodating part 84 also serves a function for positioning, it is further ensured that the outer casing body 40 is assembled at a predetermined position.

The second dividing part 55 and the second rib 75 have the same configuration, and they produce the same effect. Explanations are omitted.

A reference is made to FIG. 6. The first surrounding part 71 includes the first inner hole 65 facing the other end 35*a* of the first terminal 35. The protective part 80 includes the first outer hole 86 facing the other end 35*a* of the first terminal 35 through the first inner hole 65.

Therefore, when the outer casing body 40 is attached to the first retaining body 30 and, for example, when the first terminal 35 and the first electric wire 61 are resistance-welded, one of the electrodes may be in contact with the first terminal 35 through the first inner hole 65 and the first outer hole 86 and the other one of the electrodes may be in contact with the first electric wire 61 from the U-shaped opening side. As a result, workability for resistance welding is improved. Furthermore, the first terminal 35 and the first electric wire 61 may be joined by laser welding, or the like.

The second inner hole 66, the outer hole 87, the third inner hole 67, and the outer hole 88 also have the same configuration and effect. Explanations are omitted.

Second Embodiment

Next, a second embodiment of the present invention is explained.

Figure 8:
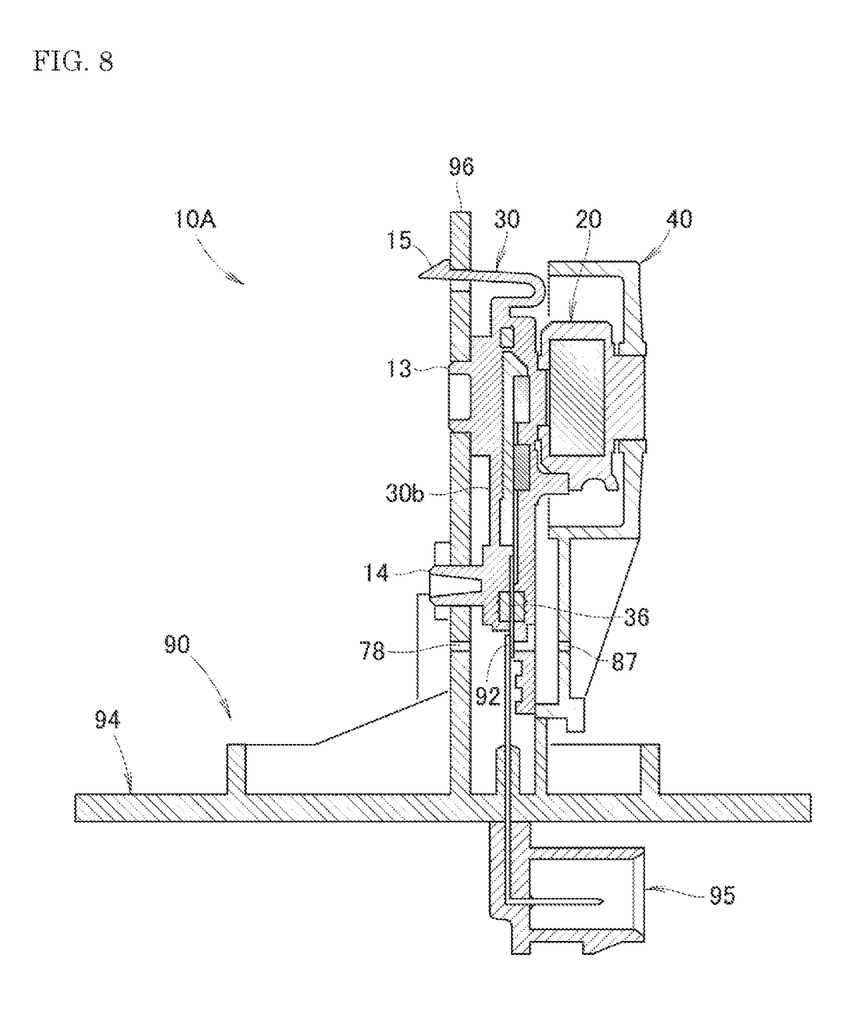
FIG. 8 is a cross-sectional view of a liquid-surface detection device according to a second embodiment of the present invention.
Figure 9:
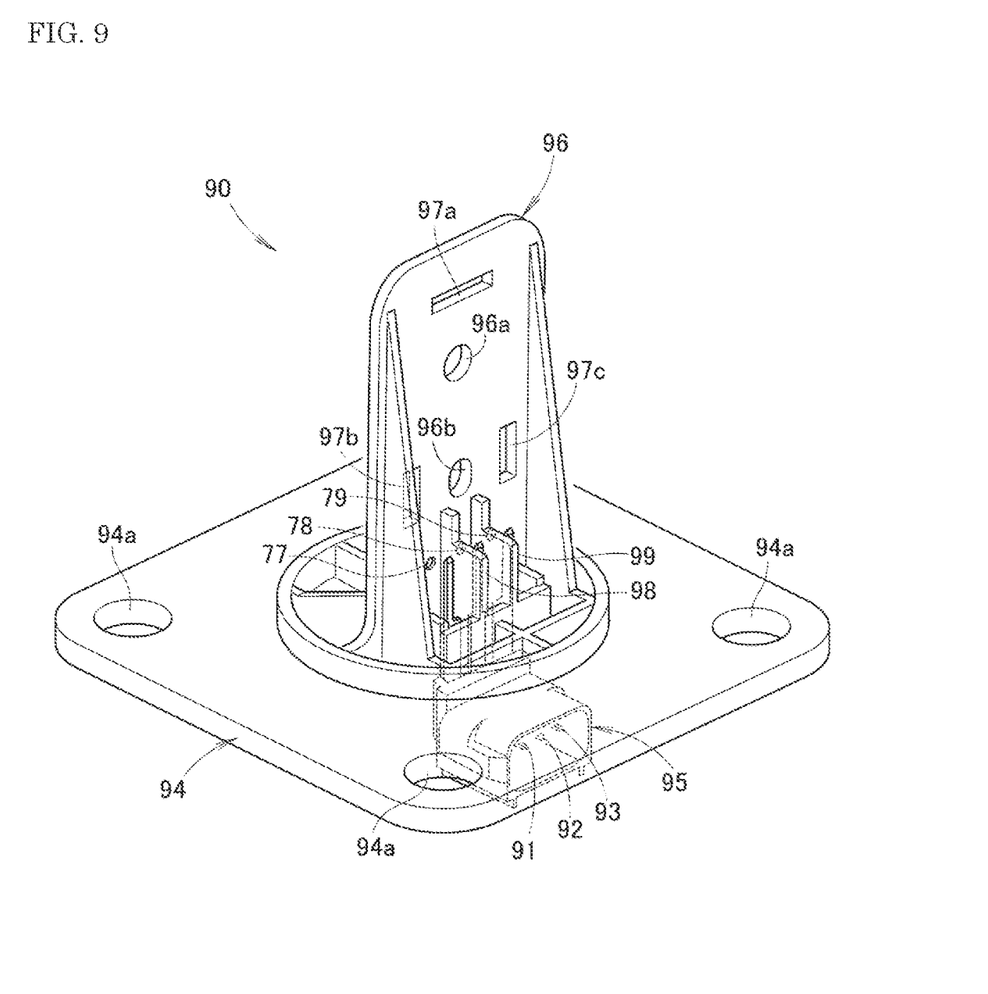
FIG. 9 is a perspective view of a stopper flange of the liquid-surface detection device shown in FIG. 8.

A reference is made to FIGS. 8, 9. According to the second embodiment, instead of the second retaining body 50 (see FIG. 2) that retains the first electric wire 61 to the third electric wire 63 in the first embodiment, a stopper flange 90 including a first tab terminal 91 to a third tab terminal 93 is provided. The first tab terminal 91 to the third tab terminal 93 are directly connected to the first terminal 35 to the third terminal 37.

The stopper flange 90 is made of, for example, polyacetal and is attached to the opening of the fuel tank. The stopper flange 90 includes: a flange part 94; a connection part 95 attached to the lower surface of the flange part 94 and having the first tab terminal 91 to the third tab terminal 93 by insert molding; and a support part 96 attached to the upper surface of the flange part 94 and supporting the first retaining body 30.

The flange part 94 includes four fixing holes 94*a* for fixing the stopper flange 90 to the fuel tank. The support part 96 includes: boss holes 96*a* and 96*b* into which the positioning bosses 13 and 14 are inserted; engagement holes 97*a* to 97*c* with which the hooks 15 to 17 are engaged; and a first dividing part 98 and a second dividing part 99 extending toward the back surface portion 30*b* of the first retaining body 30.

The support part 96 faces the back surface portion 30*b* of the first retaining body 30. The support part 96 has a first circular hole 77 facing the first tab terminal 91. Similarly, the support part 96 has a second circular hole 78 facing the second tab terminal 92. The support part 96 has a third circular hole 79 facing the third tab terminal 93.

The rest of the configuration is the same as that of the liquid-surface detection device 10 according to the first embodiment; the reference numerals are commonly used, and explanations are omitted. The predetermined effect of the present invention may be also obtained in a liquid-surface detection device 10A. Further, according to the liquid-surface detection device 10A, the following unique effect may be obtained with the above configuration.

The support part 96 includes the first dividing part 98 and the second dividing part 99. That is, as the first dividing part 98 and the second dividing part 99 are provided in part of the stopper flange 90 that fixes the liquid-surface detection device 10A to the fuel tank, or the like, electrolytic corrosion may be suppressed without increasing the number of parts.

In addition, the support part 96 includes the first circular hole 77 to the third circular hole 79 facing the first tab terminal 91 to the third tab terminal 93. Therefore, even when the first surrounding part 71 to the third surrounding part 73 of the first retaining body 30 are covered with the support part 96, one end of the electrode for resistance welding may be in contact with the first tab terminal 91 to the third tab terminal 93 through the first circular hole 77 to the third circular hole 79. Workability of resistance welding is improved.

It is to be noted that the present invention is not limited to the first and the second embodiments as long as the function and effect of the present invention are exhibited.

INDUSTRIAL APPLICABILITY

The liquid-surface detection device according to the present invention is suitable for mounting in a fuel tank of a vehicle.

DESCRIPTION OF REFERENCE NUMERALS

| | |
|---|---|
| 10 | Liquid-surface detection device |
| 11 | Float |
| 12 | Arm |
| 20 | Magnetic part |
| 30 | First retaining body |
| 31 | Magnetic detection element (detection part) |
| 35 | First terminal, 35a Other end |
| 36 | Second terminal, 36a Other end |
| 37 | Third terminal, 37a Other end |
| 40 | Outer casing body |
| 50 | Second retaining body |
| 52 | Lid part |
| 54 | First dividing part, 54a Proximal end part, 54b Distal end part |
| 55 | Second dividing part, 55a Proximal end part, 55b Distal end part |
| 56 | First pressing part |
| 57 | Second pressing part |
| 58 | Third pressing part |
| 61 | First electric wire (electroconductive part) |
| 62 | Second electric wire (electroconductive part) |
| 63 | Third electric wire (electroconductive part) |
| 65 | First inner hole |
| 66 | Second inner hole |
| 67 | Third inner hole |
| 71 | First surrounding part, 71a Bottom part, 71b Front wall part, 71c Rear wall part, 71d Electric-wire retaining part |
| 72 | Second surrounding part, 72a Bottom part, 72b Front wall part, 72c Rear wall part, 72d Electric-wire retaining part |
| 73 | Third surrounding part, 73a Bottom part, 73b Front wall part, 73c Rear wall part, 73d Electric-wire retaining part |
| 74 | First rib |
| 75 | Second rib |
| 77 | First circular hole |
| 78 | Second circular hole |
| 79 | Third circular hole |
| 80 | Protective part |
| 84 | First accommodating part |
| 85 | Second accommodating part |
| 86 | First outer hole |
| 87 | Second outer hole |
| 88 | Third outer hole |
| 90 | Stopper flange |
| 91 | First tab terminal (electroconductive part) |
| 92 | Second tab terminal (electroconductive part) |
| 93 | Third tab terminal (electroconductive part) |
| 94 | Flange part |
| 95 | Connection part |
| 96 | Support Part |
| 98 | First dividing part |
| 99 | Second dividing part |

The invention claimed is:

1. A liquid-surface detection device comprising:
a float that floats on a liquid surface;
a magnetic part that rotates in accordance with a movement of the float;
a detection part that detects magnetism which changes due to a rotation of the magnetic part;
a plurality of terminals having one end connected to the detection part;
a first retaining body that retains the terminals and rotatably supports the magnetic part;
a second retaining body that is attached to the first retaining body; and
an electroconductive part that is retained by the second retaining body and connected to other ends of the terminals,
wherein the first retaining body includes substantially U-shaped surrounding parts that surround the other ends of the terminals, respectively,
wherein the second retaining body includes a dividing part that is sandwiched between one of the surrounding parts and another of the surrounding parts, and
wherein one end of the dividing part protrudes toward opening sides of the surrounding parts.

2. The liquid-surface detection device according to claim 1, further comprising an outer casing body that covers the magnetic part,
wherein the outer casing body includes a protective part that covers bottom sides of the surrounding parts, and the protective part is provided with an accommodating part that accommodates a distal end part of the dividing part.

3. The liquid-surface detection device according to claim 2, wherein each of the surrounding parts includes an inner hole facing the other ends of the terminals, and the protective part includes an outer hole facing the other ends of the terminals through the inner hole.

4. The liquid-surface detection device according to claim 2, wherein each of the surrounding parts includes an inner hole facing the other ends of the terminals.

5. The liquid-surface detection device according to claim 1, wherein each of the surrounding part includes an inner hole facing the other ends of the terminals.

* * * * *